United States Patent [19]

Heess et al.

[11] 4,266,447
[45] May 12, 1981

[54] APPARATUS AND METHOD FOR IMPROVING THE JOLT CONTROL IN A MOTOR VEHICLE DRIVE SYSTEM

[75] Inventors: Gerhard Heess, Stuttgart; Manfred Schwab, Gerlingen; Walter Stroh, Cleebronn, all of Fed. Rep. of Germany

[73] Assignee: Robert Bosch GmbH, Stuttgart, Fed. Rep. of Germany

[21] Appl. No.: 89,465

[22] Filed: Oct. 30, 1979

[30] Foreign Application Priority Data

Nov. 9, 1978 [DE] Fed. Rep. of Germany ....... 2848624

[51] Int. Cl.³ .............................................. B60K 41/08
[52] U.S. Cl. ....................................... 74/858; 74/852; 74/866
[58] Field of Search ................... 74/866, 851, 852, 858

[56] References Cited

U.S. PATENT DOCUMENTS

| 3,354,744 | 11/1967 | Kühnle et al. ...................... 74/866 X |
| 3,792,630 | 2/1974 | Hause ................................. 74/851 X |
| 3,814,224 | 6/1974 | Podssuweit et al. .............. 74/858 X |

FOREIGN PATENT DOCUMENTS

| 1524354 | 4/1968 | France . | |
| 1080415 | 10/1960 | Fed. Rep. of Germany . | |
| 1626427 | 9/1971 | Fed. Rep. of Germany . | |
| 2109620 | 10/1971 | Fed. Rep. of Germany . | |
| 2163979 | 5/1978 | Fed. Rep. of Germany . | |
| 2726377 | 12/1978 | Fed. Rep. of Germany ............ 74/866 |
| 929621 | 6/1963 | United Kingdom . | |
| 1053049 | 12/1966 | United Kingdom ..................... 74/851 |

*Primary Examiner*—Rodney H. Bonck
*Attorney, Agent, or Firm*—Frishauf, Holtz, Goodman & Woodward

[57] ABSTRACT

The initiation and end of the application of a jolt control system to the internal combustion engine during gearshift operations is matched to then-present operating conditions by determining the engine speeds at which the control is to be initiated and ended as a function of the engine speed at the start of the gearshifting. For this purpose, the initial speed is digitalized and used as an address for a storage which contains the desired values. In a second embodiment, the speed at the end of the gearshift is determined and the values read out from storage are speed increment values which are added to the speed at the start of the gearshifting and subtracted from the speed at the end of the gearshift during downshift operations, and vice versa during upshift operations, to determine the engine speeds at which the jolt control is to be initiated and terminated.

14 Claims, 7 Drawing Figures

APPARATUS AND METHOD FOR IMPROVING THE JOLT CONTROL IN A MOTOR VEHICLE DRIVE SYSTEM

The present invention relates to jolt control systems in motor vehicles and, more particularly, jolt control in motor vehicles wherein the drive system includes an internal combustion engine and an automatic transmission which is variable in steps.

BACKGROUND AND PRIOR ART

Jolt control systems are known in which the torque delivered by the internal combustion engine is reduced throughout the shift operation. For example, in British Pat. No. 929,621, a system is described in which the upshift signals activate monostable multivibrators which cause a temporary closing of the throttle valve.

German Pat. No. 10 80 415 describes a jolt control system in which a switch is operated when a shaft has predetermined angular positions. Operation of the switch activates a relay and a solenoid controlling a linkage which determines the opening of the throttle valve or the ignition timing.

U.S. Pat. No. 3,354,744 describes apparatus in which a shift command operates a pawl which blocks the fuel supply from the internal combustion engine during the shift operation until synchronous operation of the different parts of the transmission has been reestablished.

In the system described in DE-AS 16 26 427, the speed of the internal combustion engine is decreased during the shifting operation by a change in the ignition timing. A delay circuit is supplied which becomes operative at the start of the shift operation.

In French Pat. No. 1,524,354 a timing circuit interrupts the fuel injection for a predetermined time during the shift operation.

Similarly, in DE-AS 21 09 620, a circuit interrupting fuel injection is activated after a time delay following the activation of the solenoid valve effecting the shift.

Finally, in the system disclosed in DE-AS 21 63 979, the upshift signal applied to the automatic transmission is differentiated and the so-differentiated signal is applied to a computer which decreases the width of the pulse controlling the injection time.

These known arrangements for decreasing the engine torque during gear shifting have the common disadvantage that the fuel supply is decreased or the timing changed either throughout the whole shift operation or, by means of a timing circuit, for a predetermined time interval. None of these systems consider that the actual time interval should vary as a function of a number of different parameters as, for example, the particular gears involved in the shift, the actual engine speeds, the load on the engine, etc. Applying the jolt control during a predetermined time interval therefore does not result in an actual optimum jolt reduction.

THE INVENTION

It is an object of the present invention to control the start and end of the application of the jolt control apparatus in dependence on the engine speed, thereby effecting an optimum matching to the particular shift operation. The jolt control according to the present invention will, for example, keep the full engine torque from being applied to the free-wheel, thereby preventing a very sizable jolt. On the other hand, synchronous operation should be reestablished as soon as possible so that the jolt control should only be applied shortly prior to the time that the synchronous speed is reached. The exact points at which the jolt control should be applied can therefore be determined very exactly as a function of engine speeds.

The system of the present invention therefore comprises means for sensing the speed of the engine and furnishing an engine speed signal corresponding thereto. The initiating and end speeds at which the control is to be initiated and ended, respectively, are then determined as a function of engine speed at the time that the gearshift operation is initiated.

DRAWINGS DESCRIBING PREFERRED EMBODIMENTS

Figure 1:
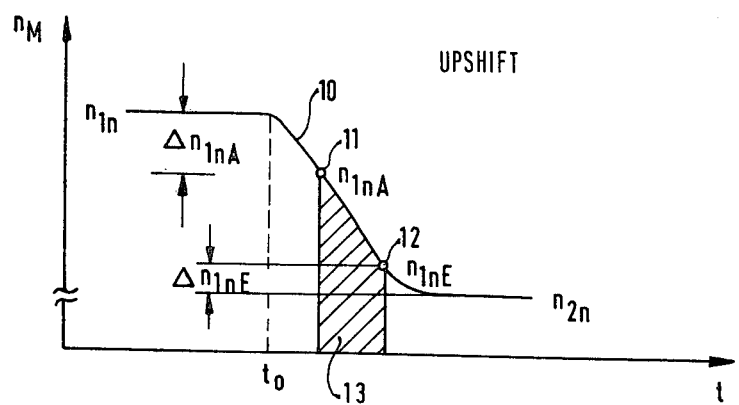
FIG. 1 is a diagram showing the variation of engine speed with respect to time during an upshift.

FIG. 1 shows the variation of engine speed $n_M$ as a function of time t for an upshift. The start of the shift operation takes place at time $t_o$ and the corresponding engine speed $n_M$ has the value $n_{1n}$. The numeral "1" indicates that the speed is the engine speed at the start of the shift; the designation "n" refers to the actual numerical value of the speed. As will be described in greater detail below, the engine speed $n_M$ is processed digitally, and specific engine speed values are assigned as addresses to particular storage locations in a digital storage. The subscript "n" therefore constitutes the address to which that speed $n_M$ is assigned. The engine speed at the end of the shift is indicated by $n_{2n}$. The subscript "2" indicates that the speed at the end of the shift (final speed) is concerned. Engine speed value $n_{1nA}$, representing the speed at which the control is to be initiated (initiating speed) and represented by point 11 in FIG. 1, and the end speed $n_{1nE}$ at which the control is to be terminated (point 12 FIG. 1) are determined as a function of the initial speed $n_{1n}$. Points 11 and 12 therefore define a region 13 during which the jolt control is to be applied. In accordance with a first preferred embodiment of the method of the present invention, the values $n_{1nA}$ and $n_{1nE}$ are determined directly as a function of initial speed $n_{1n}$. In accordance with the second preferred embodiment of the present invention, the engine speed $n_{2n}$ at the end of the shift operation is first determined as a function of speed $n_{1n}$ and taking into consideration the change in gear ratio. Secondly, speed difference values $\Delta n_{1nA}$, $\Delta n_{1nE}$ are also determined as a function of initial speed $n_{1n}$. For an upshift (FIG. 1) the initiating speed $n_{1nA}$ is then derived as the difference between the initial speed $n_{1n}$ and the first difference $\Delta n hd 1nA$; correspondingly, the end speed, that is the speed at which the control is to be terminated, is determined by adding the second difference value $\Delta n_{1nE}$ to the terminating speed $n_{2n}$. This means that for an upshift the jolt control is applied when the engine speed has decreased by a predetermined amount, namely $\Delta n_{1nA}$ and is ended when the engine speed $n_M$ has approached the terminating speed $n_{2n}$ by the second predetermined difference $\Delta n_{1nE}$.

Figure 2:
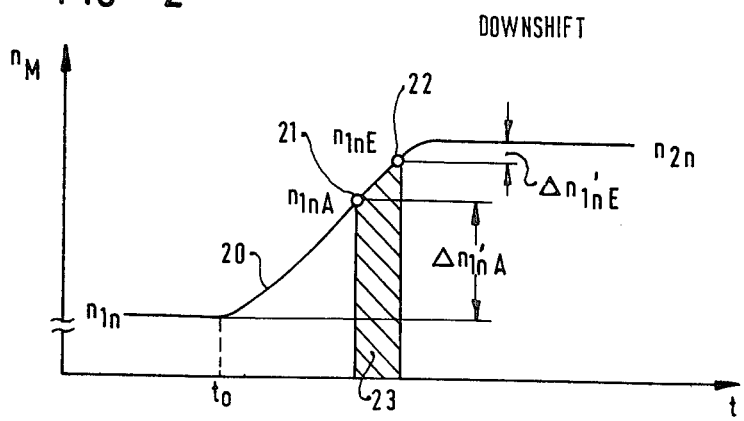
FIG. 2 is a diagram showing the variation of engine speed as a function of time during a downshift.

The conditions during a downshift are shown in FIG. 2. During a downshift the engine speed increases from a relatively low value $n_{1n}$ to a higher final value $n_{2n}$. As described with reference to FIG. 1, speeds $n_{1nA}$ and $n_{1nE}$ (points 21, 22, respectively) represent the speeds at which the control is to be initiated and terminated, respectively. The shaded region therefore indicates the region during which the jolt control is effective. Again, speeds $n_{1nA}$ and $n_{1nE}$ can be determined directly from the initial speed or can be determined by the use of difference values $\Delta n'_{nA}$ and $\Delta n'_{n1E}$ in dependence on the initial speed $n_{1n}$. Points 21 and 22 are then determined by addition and subtraction of these values to and from the initial speed and the final speed, respectively.

The speed value for point 21 is determined so that the control is applied before the free-wheel engages but sufficiently late so that the engine speed $n_M$ can increase rapidly in order to reach synchronous operation.

Figure 3:
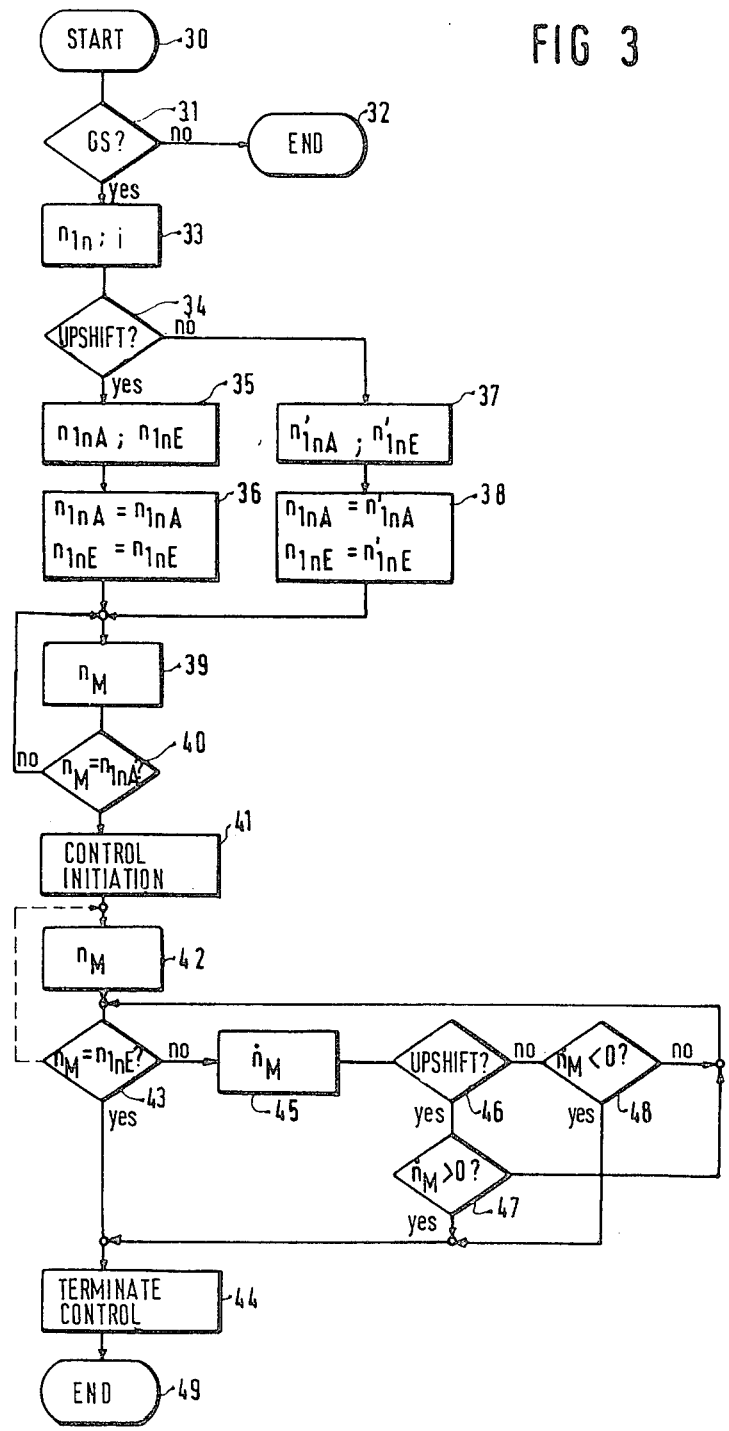
FIG. 3 is a flow chart for a first preferred embodiment of the method of the present invention.

A flow chart for the method of the present invention is shown in FIG. 3. Only the part of the program relevant to the present invention is shown. The program may be initiated either by an interrupt of the main program in response to the gearshift initiating signal or it may be a periodically carried out subprogram. The latter embodiment is shown in FIG. 3. The absence or presence of a gearshift operation is determined in block 31. If no gearshift operation is present, the subprogram is ended and a return to the main program effected. In the presence of a gearshift command, a change in gear ratio i and the initial speed $n_{1n}$ are determined. A test for an upshift operation is carried out in block 34. If an upshift is present, the values $n_{1nA}$, $n_{1nE}$ are read out from storage locations addressed by subscript "n" of initial speed $n_{1n}$. Similarly, if a downshift is being carried out, the values $n'_{1nA}$, $n'_{1nE}$ are read out from the storage (block 37). The so read out values are stored in a buffer storage (blocks 36, 38, respectively). A signal signifying the then-present engine speed is stored (block 39) and compared to the value $n_{1nA}$ (block 40). The comparison is repeated until the actual engine speed is equal to the initiating speed. When this equality occurs, jolt control is initiated (block 41).

As indicated by block 42, the engine speed is continually sampled and compared now to the speed at which the control is to be ended (block 43). In a simplified form of the method of the present invention, the test is simply repeated until such time as the end speed is reached. This is indicated by the broken line in FIG. 3. In a slightly more complicated version, which is actually preferred, if the engine speed has not yet reached the desired n speed, the acceleration $\dot{n}_M$, that is the gradient of engine speed, is calculated either as a true differential or as a difference in engine speed over a predetermined time interval. A test is then carried out as to whether an upshift or a downshift operation is being carried out. If an upshift, it is determined (block 47) whether the speed gradient $\dot{n}_M$ is greater than zero (block 47). If a downshift is present, a test is carried out as to whether the same gradient is less than zero (block 48). If the speed gradient exceeds zero during an upshift or is less than zero during a downshift, the jolt control is immediately terminated (block 44). Under all other conditions, a test as to whether the actual engine speed is less than the desired speed at which the control is to be ended (block 43) is repeated and, when the latter speed has been reached, the jolt control is also terminated. The termination of the jolt control concludes the program (block 49).

A further preferred embodiment of the present invention will be explained with reference to the flow chart of FIG. 4. The same comments apply to the start of the program as did for the flow chart of FIG. 3. If the decision made in block 31 indicates that a gearshift is being carried out, the terminal speed, that is the speed at the end of the gearshift operation, is calculated as it was in the embodiment shown in FIG. 3, by multiplication of the engine speed at the start of the gearshift operation by the change in gear ratio ($n_{1n} \times i$). In accordance with the second embodiment indicated by the broken lines in FIG. 4, the first derivative with respect to time of the engine speed at the time that the gearshift is initiated, that is $\dot{n}_{1n}$, is calculated in block 330. The engine speed at the end of the gearshift operation, $n_{2n}$, is then calculated in accordance with the equation:

$$n_{2n} = n_{1n}i - \dot{n}_{1n}t_S$$

in a block 500. Here $t_S$ is a constant which corresponds to the average time required to carry out the gearshift. This computation thus takes into consideration that, particularly for long required shift times, the velocity of the vehicle cannot be considered a constant and therefore the vehicle acceleration must be taken into consideration when computing the synchronous speed at the end of the gearshift as a function of the synchronous speed at the start of the gearshift. The basic assumption in the above formula is, of course, that the acceleration will remain constant.

Whether an upshift or a downshift operation is taking place is decided in block 51. First, depending upon whether it is an upshift or a downshift, the associated speed difference values $\Delta n_{1nA}$, $\Delta n_{1nE}$ for an upshift or $\Delta n'_{1nA}$, $\Delta n'_{1nE}$ for downshift are read out in blocks 52, 54, respectively, from corresponding storage locations. The initiating speed values and the end speed values for upshift and downshift, respectively are then computed in blocks 53, 55, respectively in accordance with the following equations: for upshift $$n_{1nA} = n_{1n} - \Delta n_{1nA}$$

$$n_{1nE} = n_{2n} + \Delta n_{1nE}$$

for downshift $$n_{1nA} = n_{1n} + \Delta n'_{1nA}$$

$$n_{1nE} = n_{2n} - \Delta n'_{1nE}$$

After these values have been determined, the program continues as discussed with reference to blocks 39 ff of FIG. 3.

Figure 5:
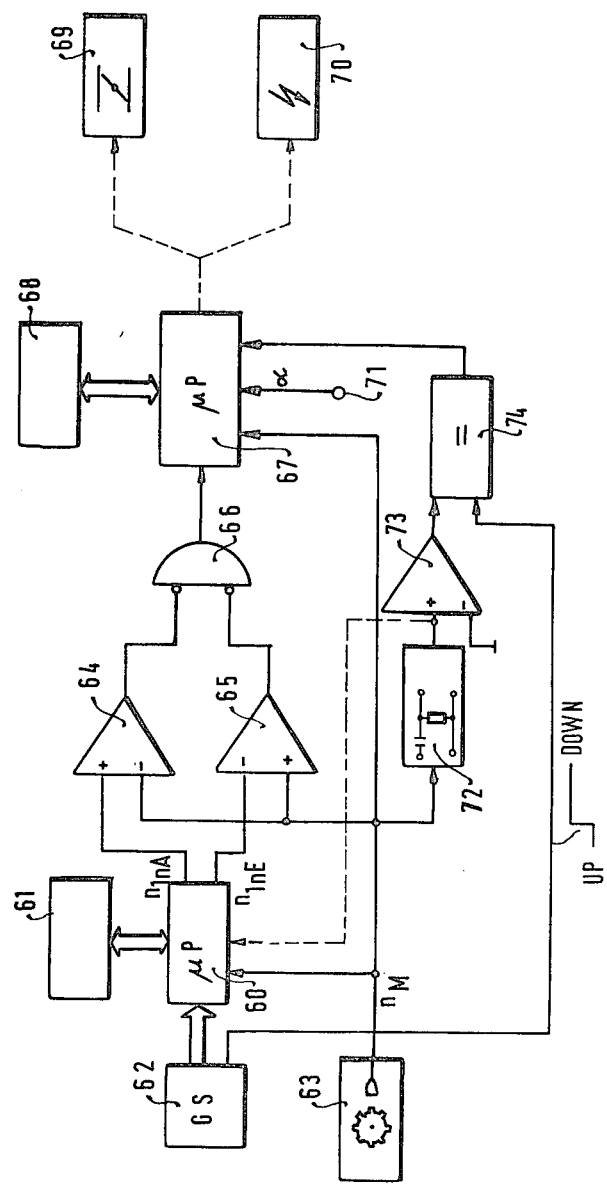
FIG. 5 is a block diagram of a preferred embodiment of the apparatus of the present invention.

In the block diagram of FIG. 5, an address computer 60 is connected to a storage 61 (ROM), a transmission control stage 62 which furnishes an upshift or downshift signal, and an engaged gear signal signifying the then-engaged gear, as well as an engine speed sensor 63. Two output terminals of computer 60 are connected to the inputs of a first comparator 64 and a second comparator 65, whose outputs are connected to the inverting inputs of an AND gate 66. The output of AND gate 66 is connected to an output computer stage 67 which is part of a computer which also includes a storage 60 (ROM). Of course in practice units 60, 61, 67 and 68 can all be part of one microcomputer whose CPU includes units 60 and 67 and whose ROM includes units 61 and 68. The output of computer stage 67 cooperates with the fuel supply controller 69 or with the ignition timing control 70 to change the fuel supply or the ignition timing in a well known manner shown in the cross-referenced publications.

The output of speed sensor 63 is also connected to one input of computer stage 67, as is the output of a stage furnishing a signal signifying the then-present engine load (terminal 71). A differentiating stage 72 is also connected to the output of engine speed sensor 63. The output of differentiating stage 72 is connected to the direct input of an operational amplifier 73 whose negative input is grounded. The output of operational amplifier 73 is connected to one input of a comparator 74. The second input of comparator 74 is connected to the output of transmission control stage 62 and receives a "1" signal when a downshift is being carried out and a "0" signal when an upshift is being carried out. The output of comparator 74 is also applied to one input of computer stage 67. As indicated by a broken line in FIG. 5, the output of differentiating stage 72 may also be connected to one input of address computer 60.

Figure 6:
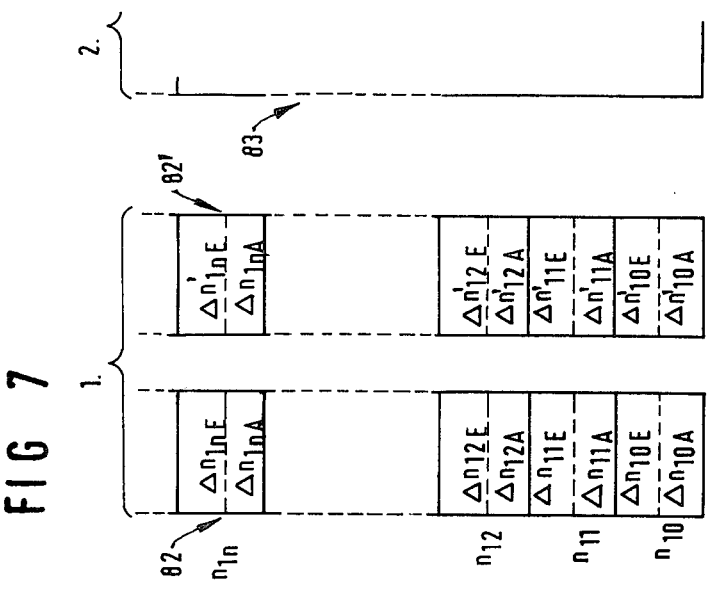
FIG. 6 is a schematic diagram indicating assignment of storage locations for storages utilized in the first embodiment of the present invention.
Figure 7:
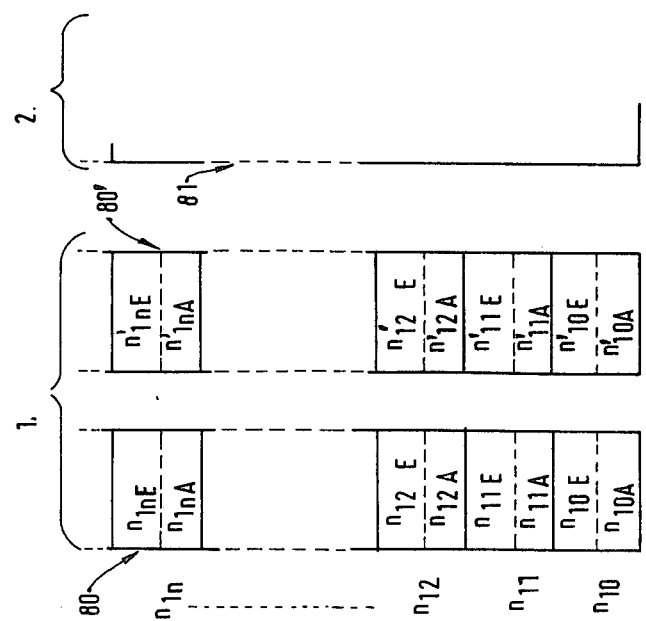
FIG. 7 is a schematic diagram of assignment of storage locations for the second preferred embodiment of the present invention.

FIGS. 6 and 7 show a preferred layout for the storage locations in ROM 61. Engine speed values for an upshift from first gear are stored in a set of storage locations 80. A second set of storage locations 81 holds similar values for an upshift from second gear. Storage locations 80' contain engine speed values for a downshift from second gear. For addressing the storage locations, a speed $n_{1n}$ at the initiation of the gearshift is digitalized in steps so that values $n_{10}$, $n_{11}$, $n_{12}$, each assigned to a pair of storage locations, result. The pair of storage locations which is addressed in this manner contains the values, for example, $n_{12A}$ and $n_{12E}$ which signify, respectively, the engine speeds at which jolt control is to be initiated and ended, respectively. The address, besides the speed values $n_{10}$, $n_{11}$, etc. must also contain information as to whether an upshift or downshift is to be carried out and what the then engaged gear is. The values $n_{10}$, $n_{11}$, etc. may, for example, be increased by an amount depending upon the type of shift and the then engaged gear. For example, the set of storage locations 80 may be addressable by numbers up to 99, set of storage locations 81 by numbers between 500 and 599, while the set of storage locations 81' would be addressable by numbers 600 to 699. In general, the speed value $n_{10}$ etc. would be increased by 500 when the engaged gear is the second gear and would be increased by 100 to indicate that a downshift rather than an upshift is being carried out. The same system would be continued with third gear or any other gear that may be present.

Correspondingly, the speed difference values $\Delta n_{1nA}$, $\Delta n_{1nE}$ would be stored in storage locations numbered in accordance with the type of shift and the then-engaged gear in sets of storage locations 82, 83, etc. shown in FIG. 7.

The apparatus shown in FIG. 5 operates as follows: address computer 60 computes the address of a storage location in ROM 61 as described above, and in response to signals furnished by transmission control stage 62 and engine speed sensor 63. At the time the gearshift is started, the values $n_{1nA}$ and $n_{1nE}$ read out from storage 61 are applied, respectively, to the direct input of comparator 64 and the inverting input of comparator 65. The inverting input of comparator 64 and the direct input of comparator 65 receive the engine speed signal. Comparators 64 or 65 may be analog or digital comparators, the engine speed signal being converted to digital form for the latter embodiment or the numbers read out from storage 61 being converted to analog form for the former embodiment. The output signals of comparator 64 and 65 determine the start and end of the operation of the jolt control system. This corresponds to the steps carried out in blocks 40 and 43 of FIG. 3. The output of AND gate 66 is a logic "1" only when the engine speed is in the regions 13 or 23 of FIGS. 1 and 2, respectively. The output signal of AND gate 66 enables computer stage 67. The latter computes the amount to which the fuel supply is to be decreased or the ignition timing retarded as a function of then-present motor speed $n_M$ and engine load $\alpha$. Specifically, the required amount of correction is read out from ROM 68 under control of the above-mentioned signals. The corresponding correction is then carried out as indicated by the broken lines connecting computer stage 67 to stages 69 and 70.

The monitoring of the first derivative with respect to time of $n_M$ during the time that the jolt control system is being applied is carried out by stages 72, 73 and 74. These stages thus carry out the steps of the method indicated in blocks 45 to 48 in FIGS. 3 and 4. Specifically, the first derivative with respect to time is generated at the output of differentiating stage 72. This is compared to a reference potential (ground potential) in operational amplifier 73. The output of operational amplifier 73 is compared to the upshift/downshift signal furnished by transmission control 62 in comparator 74. Comparator 74 furnishes a "1" output signal if either a positive acceleration exists during an upshift or a negative acceleration during a downshift. Under both of these conditions, the jolt control should be discontinued immediately.

Figure 4:
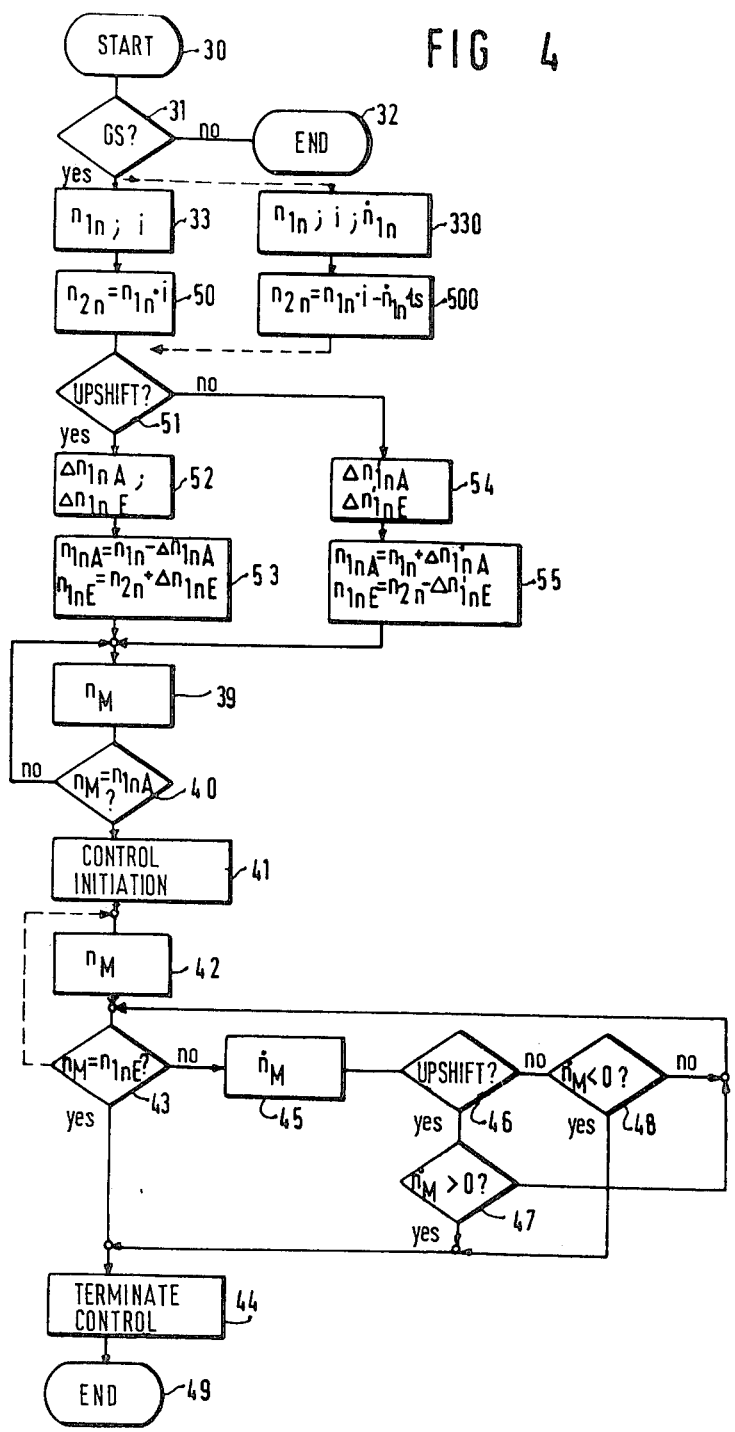
FIG. 4 is a flow chart for a second preferred embodiment of the method of the present invention.

If the method of FIG. 4 is being implemented, the numbers read out from storage 61 signify speed difference values $\Delta n_{1nA}$, $\Delta n_{1nE}$, as shown schematically in FIG. 7. In accordance with the equations given above, the engine speed values $n_{1nA}$ and $n_{1nE}$ are then computed in accordance with the type of shift and the then-engaged gear. It is true that more effort is required to compute the final synchronous speed at the conclusion of the shift operation first and then to determine the initiating and end speed for, respectively initiating and ending the jolt control by either addition or subtraction of the difference values from the initial and final speed values. However, if the final speed is computed, the possibility exists to correct it as a function of acceleration, as indicated in blocks 330 and 500 in FIG. 4. For this purpose, address computer 60 must receive a signal signifying the first derivative with respect to time of engine speed ($\dot{n}_M$) as is indicated by the broken line in FIG. 5.

Various changes and modifications may be made within the scope of the inventive concepts.

We claim:

1. In a drive system having an internal combustion engine and a transmission operable in a plurality of operator selectable gear ratios, a method for decreasing the jolt during a gear shift operation, comprising the steps of sensing the speed of said internal combustion engine at initiation of said gear shift operation and furnishing a corresponding initial speed signal;

furnishing an initiating speed signal and an end speed signal respectively signifying engine speeds for initiating and ending jolt control in response to said initial speed signal;

and decreasing the torque of said internal combustion engine from the time said speed of said engine reaches said initiating speed until the time the speed of said engine reaches said end speed.

2. A method as set forth in claim 1, wherein said step of decreasing said torque comprises the step of decreasing the fuel supply to said internal combustion engine.

3. A method as set forth in claim 1, wherein said step of decreasing said torque comprises the step of changing the ignition timing of said internal combustion engine.

4. A method as set forth in claim 1, further comprising the step of furnishing an upshift or a downshift signal when said gear shift operation is an upshift or a downshift, respectively;

and wherein said step of furnishing said initiating speed signal and said end speed signal comprises furnishing an initiating speed signal and an end speed signal having a value dependent also upon the absence or presence of said upshift signal.

5. A method as set forth in claim 4, further comprising the step of furnishing an engaged gear signal signifying the gear engaged at the start of said gear shift operation;

and wherein said step of furnishing said initiating speed signal and said end speed signal comprises furnishing an initiating speed signal and an end speed signal having a value depending also upon said engaged gear signal.

6. A method as set forth in claim 1, wherein said step of furnishing said initiating speed signal and said end speed signal comprises the steps of furnishing a gear ratio change signal (i) corresponding to the change in gear ratio carried out in said gear shift operation, computing the final speed of said internal combustion engine at the end of said gear shift operation from said initial speed signal and said gear ratio change signal, furnishing initial and final speed difference signals in response to said final speed signal, and computing said initiating speed signal from said initial speed signal and said initial speed difference signal, and said end speed signal from said final speed signal and said final speed difference signal.

7. A method as set forth in claim 6, further comprising the step of furnishing a first acceleration signal corresponding to the first derivative with respect to time of said speed of said engine at the start of said gear shift operation;

and wherein said step of furnishing said final speed signal comprises computing said final speed signal in accordance with the formula:

$$n_{2n} = n_{1n} i - \dot{n}_{1n} t_s$$

where $n_{2n}$ is said final speed signal, $n_{1n}$ is said initial speed signal, $\dot{n}_{1n}$ is said first acceleration signal and $t_s$ is a constant.

8. A method as set forth in claim 4, further comprising the step of computing the acceleration of said internal combustion engine during said gear shift operation and furnishing a first and second acceleration signal when said acceleration exceeds and is less than zero, respectively, and interrupting said decrease of said torque of said internal combustion engine in the joint presence of said first acceleration signal and said upshift signal or said second acceleration signal and said downshift signal.

9. A method as set forth in claim 1, further comprising the step of monitoring the speed of said engine and the load on said engine during said gear shift operation and furnishing corresponding present load and present speed signals;

and wherein said step of decreasing said torque of said internal combustion engine comprises the step of decreasing said torque to a value associated with said present load signal and said present speed signal.

10. In a drive system having an internal combustion engine and transmission means operative in a plurality of operator selectable gear ratios, apparatus for decreasing jolt during gear shift operations, comprising means for sensing the speed of said internal combustion engine and furnishing an initial speed signal corresponding thereto;

means for furnishing an initiating speed signal and an end speed signal in response to said initial speed signal, said initiating and end speed signals respectively signifying a desired engine speed for initiating and ending jolt control;

and means for decreasing the torque of said internal combustion engine from the time said speed of said engine corresponds to said initiating speed and until the time said speed of said engine corresponds to said end speed.

11. A system as set forth in claim 10, wherein said transmission means comprises transmission control means for furnishing an upshift signal, a downshift signal and an engaged gear signal, respectively signifying driver initiated upshift, downshift, and then engaged gear; and wherein said initiating and end speed signal furnishing means comprises first storage means (61) having a plurality of addressable storage locations storing said initiating speed signals and said end speed signals, and means (60) connected to said engine speed sensor means, said transmission control means and said storage means for computing addresses in said storage means in response to said engine speed signal and said upshift or downshift signal, thereby calling out said initiating speed signal and said end speed signal from said storage means.

12. A system as set forth in claim 11, wherein said torque decreasing means further comprises means (64, 65, 66) connected to said engine speed sensor means and said address computing means for comparing said engine speed signal to said initiating speed signal and said end speed signal and furnishing an enable signal while said engine speed signal signifies an engine speed between said initiating speed and said end speed, and means (67–70) connected to said enable signal furnishing means for reducing said torque of said engine in response to said enable signal.

13. A system as set forth in claim 12, further comprising means for furnishing a present load signal indicative of the then-present load on said engine;

and wherein said torque decreasing means further comprises output computer means (67) connected to said load signal furnishing means, said engine speed sensor means and said enable signal furnishing means for computing an adjustment signal having an amplitude varying as a function of said present load signal and said engine speed signal in response to said enable signal.

14. A system as set forth in claim 10, wherein said jolt decreasing apparatus further comprises means (72, 73) connected to said engine speed sensor means for differentiating said engine speed signal and furnishing a positive and negative acceleration signal when the so-differentiated engine speed signal is positive and negative, respectively, and means (74) connected to said transmission control means, said differentiating means and said torque decreasing means for inhibiting the operation of said torque decreasing means in the joint presence of said upshift signal and said positive acceleration signal or the joint presence of said negative acceleration signal and said downshift signal.

* * * * *